Patented Oct. 9, 1934

1,975,839

UNITED STATES PATENT OFFICE

1,975,839

PROCESS FOR BREAKING PETROLEUM EMULSIONS

Melvin De Groote, St. Louis, Bernhard Keiser, Webster Groves, and Arthur F. Wirtel, Richmond Heights, Mo., assignors to Tretolite Company, Webster Groves, Mo., a corporation of Missouri No Drawing. Application February 5, 1934, Serial No. 709,790

6 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type to the action of a treating agent or demulsifying agent of a particular kind or composition hereinafter described, thereby causing the emulsion to break down and separate into its component parts of oil and water or brine, when the emulsion is permitted to remain in a quiescent state after such treatment, or equivalent separatory procedure.

The treating agent or demulsifying agent used in our process consists of a mixture of sulfonated anthracene oil bodies, derived from the sulfonation of anthracene oil alone (which of itself is a mixture) or anthracene oil in the presence of condensing materials capable of chemical combination with the constituents of the anthracene oil, and of a kind to be described. Such anthracene sulfonic acid bodies may be in the form of acids, or in the form of salts or in the form of esters.

Anthracene oil is a coal tar oil derived from the fractional distillation of coal tar. Sometimes a fraction is separated between 270° C. and the pitch-forming point of coal tar, and this oil is known as anthracene oil. Sometimes a fraction is taken from 200° C. to the pitch point, and this is known as dead oil or heavy oil. The less volatile portion of the heavy oil, that is, the portion vaporizing above 270° C., constitutes the anthracene oil. The upper boiling limit of anthracene oil may be considered as approximately 365 to 400° C. This oil has a specific gravity of approximately 1.1 and varies in color from yellowish-green to almost black. It contains anthracene, naphthalene, methyl-naphthalene, pyrene, acridene, phenanthracene, fluorene, etc., all of which are solids, except methyl-naphthalene, together with a mixture of oils concerning which there is relatively little known. In the manufacture of anthracene, the anthracene fraction is allowed to run into shallow tanks, and the solid components separate out on cooling. This process requires from one to two weeks. The semi-solid mass is transferred to filter bags and compressed. The oil which is pressed out is also known as anthracene oil, but generally the percentage of anthracene contained therein is only approximately one-half or less of the content, found in the crude anthracene oil derived directly from the coal tar. As will be subsequently pointed out, the effectiveness of our reagent is not dependent on the percentage of anthracene present, because the reagent derived from the low content anthracene oil may even be more effective on some emulsions, than one derived by similar chemical treatment from pure anthracene. Therefore, such pressed anthracene oil is also acceptable as a raw material for the manufacture of the reagent to be employed in our process. Likewise, the anthracene cake may be extracted with a low boiling solvent, such as solvent naphtha, and the solvent naphtha may be subsequently distilled off, leaving behind an extracted anthracene oil. This extracted anthracene oil is just as satisfactory as any other variety.

We are aware that U. S. Patent No. 1,596,596, dated August 17, 1926, to Melvin De Groote, discloses the treatment of petroleum emulsions by means of a reagent comprising a polycyclic sulfonic acid salt. Some of the reagents employed in the present process represent a specific class of the broad materials contemplated in said De Groote patent, but are not specifically referred to in said De Groote patent. As has been previously pointed out, the effectiveness of the process employing the present reagent is not due in any marked degree to the presence of anthracene sulfonic acid or like materials, because by means of the present process certain emulsions may be broken readily, which are affected only slowly by either naphthalene or anthracene sulfonic acids or their salts. Likewise, anthracene oil having a relatively low anthracene content; for instance, 10 to 12 percent of anthracene, is just as effective as an anthracene oil having a relatively high anthracene content, for instance, 25 to 30 percent anthracene. The effectiveness of the process employing our present reagent must be ascribed primarily to the other constituents or the mixture present in anthracene oil. The present process does not contemplate the use of a single component, but is directed to the use of a reagent, which in its very nature must consist of a mixture of several components.

It has long been known that certain classes of reagents, when present during the sulfonation of an aromatic material, and particularly polycyclic aromatic materials such as naphthalene, combine or condense with the aromatic material by replacing a hydrogen atom of the aromatic nucleus. One common type of reaction is the reaction in which an unsaturated fatty acid such as oleic acid or the like is mixed with the aromatic substance, and subjected to sulfonation. This reaction is employed for the production of Twitchell reagents. Another similar reaction is one in which alcohols, particularly alcohols having less than twelve carbon atoms, are mixed with an aromatic body, and subjected to sulfonation. A reaction of this type is commonly employed for the production of propylated naphthalene sulfonic acid or butylated naphthalene sulfonic acid or salts thereof, which are common, every-day wetting agents. Similarly, it is well known that aldehydes such as formaldehyde, furfural, etc., may be mixed with various aromatic materials prior to sulfonation, and that during such process condensation or substitution takes place whereby the aldehyde residue replaces a hydrogen of the aromatic nucleus. Similar reactions are known to take place in which the alcohols or aldehydes are replaced by ketones. Aldehydes such as formaldehyde, paraldehyde, furfural, or benzaldehyde, suitable as condensing agents, are described in U. S. Patent No. 1,766,062, dated June 24, 1930, to De Groote and Keiser. Likewise, U. S. Patent No. 1,766,066, dated June 24, 1930, to De Groote and Wirtel, describe suitable ketones such as acetone, methylethylketone, diethylketone or dipropylketone, which may be employed in reactions of the kind indicated. Suitable alcohols include methyl, ethyl, butyl, propyl, amyl, hexyl, hexahydrophenol, benzyl alcohol, and cyclo-butonal. Fatty materials which may be employed are castor oil, red oil, olive oil, linseed oil, etc.

If one denotes the aromatic bodies of anthracene oil, by $R_1$ (but recognizing that $R_1$, in reality, is a mixture of aromatic bodies, such as $R^1$, $R^2$, $R^3$, etc.) then one may denote the sulfonic acids derived from anthracene oil by the formula $R.HSO_3$, and then this formula may be rewritten as $R'H.HSO_3$, wherein $R'$ indicates the aromatic nucleus residue or residues minus a hydrogen, and $HSO_3$ indicates the conventional sulfonic acid radical. If one re-writes the last formula as $R'X.HSO_3$, then X may represent either a hydrogen atom or else a residue or residues substituted in the aromatic nuclei and derived from the class of reagents comprising fatty acids, alcohols having less than twelve carbon atoms, ketones, and aldehydes. The production of these materials, of course, as has been previously stated, is well known. The anthracene oil, which is a mixture of various aromatic compounds, may be sulfonated directly with an equal volume or less of 66° sulfuric acid, and the temperature may be maintained at 35 to 40° C. until the sulfonated mass shows itself to be substantially all water-soluble. The product is then washed with an equal volume of water, allowed to separate and the wash water withdrawn. The acidic mass may be used as such, or may be used after neutralization with any suitable base or after esterification or after combination with an amine. If desired, a fatty acid or an alcohol or an aldehyde or a ketone may be mixed with the anthracene oil prior to sulfonation, or the fatty acid, aldehyde, alcohol, or ketone may be reacted in a separate vessel with sulfuric acid and then admixed with the anthracene oil and more acid added if required. The fatty acid, aldehyde, ketone, or alcohol may be added after the sulfonation of the anthracene oil. All these reactions are well known, and the general manner of conducting such reactions is common knowledge. In any reaction involving the treatment of an aldehyde with sulfuric acid, caution must be taken that the reaction does not reach a rate of explosive violence. Reactions involving alcohols, ketones or fatty acids are readily susceptible to control, and do not as a rule, involve dangerous possibilities.

As has been previously stated, this mixture of sulfonic acids, whether derived from anthracene oil alone or anthracene oil in which a selected condensing agent has been added, so as to obtain a substituted anthracene sulfonic acid, may be used as such for breaking petroleum emulsions, but it is preferable that they be used after neutralization with a basic material, or after esterification with alcohol. Suitable bases for neutralization may be alkaline compounds of sodium, potassium, or ammonium. In some instances the calcium or magnesium salts formed by reaction with calcium or magnesium hydroxide or carbonate show marked water solubility and sometimes even oil solubility. In either event, they are suitable for use. Various aliphatic, aromatic, and cyclic alcohols are suitable for esterification, including ethyl, methyl, propyl, etc. The esters thus formed may be water-soluble or oil-soluble. In some instances, it may be desirable to neutralize the hydrogen of the sulfonic radical, but not the hydrogen of the carboxyl radical. Amines may be employed for neutralizing the true sulfonic acids, as in the case of triethanolamine. The amine or ammonium salts are considered as being the equivalent of metallic salts. One acidic hydrogen may be replaced by one metal atom or by a radical, and the other acidic hydrogen may be replaced by some other substituent.

In a general way, it has been stated that the formula of these anthracene oil sulfonic acids, a mixture of which comprise the reagent employed in the present process, is $R'X.HSO_3$, wherein $R'$ is the anthracene oil aromatic nucleus residues, X is a hydrogen atom or a substituent residue derived from the class comprising fatty acids, alcohols having less than 12 carbon atoms, aldehydes, and ketones, and $HSO_3$ is the conventional sulfonic acid residue. Insofar that the hydrogen of the sulfonic group may be replaced by a metal or an alcohol radical or an amine, the formula for these materials may be rewritten $R'X.ZSO_3$, in which $R'$ and X have the previous significance, Z represents an acidic hydrogen equivalent, and $SO_3$ is the conventional sulfonic acid residue.

We prefer to prepare our reagent in the following manner: 500 (parts) of anthracene oil, obtained directly from coal tar without removal of any anthracene, and having a specific gravity of approximately 1.1, and having a distillation range of approximately 250 to 400° C., is mixed with 250 (parts) of oleic acid and the mixture sulfonated with an equal volume of 66° sulfuric acid at approximately 35° C. This temperature is maintained with constant stirring until a completely water-soluble mass is obtained. The product is then washed with an equal volume of water and allowed to stand until separated. The lower waste acid layer is withdrawn, and the upper layer is neutralized with strong ammonia until it is no longer acid to methyl orange indicator.

An equally satisfactory reagent is obtained by replacing the 250 pounds of oleic acid or red oil with 100 pounds of isobutyl alcohol. It is well known, of course, that an aromatic, particularly a polycyclic aromatic such as naphthalene, may be treated with an alcohol such as butyl alcohol in presence of sulfuric acid so as to produce a butylated aromatic sulfonic acid characterized by the fact that the butyl alcohol residue or butyl radical is substituted for a hydrogen of the aromatic nucleus. Anthracene as such and probably some of the other similar materials present in anthracene oil, are characterized as being composed of two aromatic rings joined together by a non-aromatic ring composed of two CH radicals. As a result of this peculiar composition, the replacement of a hydrogen by the butyl alcohol residue, in anthracene or a similar body, need not necessarily take place in either aromatic nucleus. In other words, the product obtained by sulfonation of a mixture of isobutyl alcohol and anthracene oil need not necessarily be a nuclear substituted product. As a matter of fact, the alkyl derivatives of anthracene in which substitution takes place in one of the two aromatic nuclei, are known as benz-alkyl derivatives, whereas those in which substitution takes place in one of the two CH radicals forming the bridge between the two aromatic nuclei, are known as gamma-alkyl derivatives. Organic chemistries generally state that in most anthracene transpositions or substitutions, the intermediate carbon atoms forming the non-aromatic bridge, are first attacked to preferentially produce the gamma-alkyl derivatives. It is believed that this is true in those instances where a relatively small amount of isobutyl or isopropyl alcohol is mixed with a relatively large amount of anthracene oil, for instance, ratio of 1 to 5 or the like. We consider these gamma-alkyl derivatives as members of the class $R'X.ZSO_3$, in which X is still a hydrogen, because no hydrogen of the aromatic nucleus has been replaced, and thus these materials are not nuclear substituted aromatic sulfonic acids.

These materials may be employed alone or in combination with other recognized demulsifying agents, such as water-softeners, modified fatty acids, salts of petroleum sulfonic acids, alkylated aromatic sulfonic acids, derivatives of polybasic carboxy acids, and the like.

In practicing our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gunbarrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature being employed. In treating exceptionally refractory emulsions of the kind known as "tank bottoms", and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results.

In general, we have found that for an average petroleum emulsion, a ratio of 1 part of treating agent to 10,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent consisting of a mixture, derived from sulfonation of the unseparated constituents of anthracene oil, and characterized by the general formula $R'X.ZSO_3$, in which $R'$ is an anthracene oil aromatic nucleus residue, X is a hydrogen atom or a substituent residue derived from the class consisting of fatty acids, alcohols having less than 12 carbon atoms, aldehydes, and ketones, Z is an acidic hydrogen equivalent, and $SO_3$ is the conventional sulfonic acid group.

2. A process for breaking petroleum emulsions of the water-in-oil type, which consists in subjecting the emulsion to the action of a demulsifying agent consisting of a mixture, derived from sulfonation of the unseparated constituents of anthracene oil, and characterized by the general formula $R'X.ZSO_3$, in which $R'$ is an anthracene oil aromatic nucleus residue, X is a substituent residue derived from fatty acids, Z is an acidic hydrogen equivalent, and $SO_3$ is the conventional sulfonic acid group.

3. A process for breaking petroleum emulsions of the water-in-oil type, which consists in subjecting the emulsion to the action of a demulsifying agent consisting of a mixture, derived from sulfonation of the unseparated constituents of anthracene oil, and characterized by the general formula $R'X.ZSO_3$, in which $R'$ is an anthracene oil aromatic nucleus residue, X is a substituent residue derived from alcohols having less than 12 carbon atoms, Z is an acidic hydrogen equivalent, and $SO_3$ is the conventional sulfonic acid group.

4. A process for breaking petroleum emulsions of the water-in-oil type, which consists in subjecting the emulsion to the action of a demulsifying agent consisting of a mixture, derived from sulfonation of the unseparated constituents of anthracene oil, and characterized by the general formula $R'X.ZSO_3$, in which $R'$ is an anthracene oil aromatic nucleus residue, $X$ is derived from oleic acid, $Z$ is an acidic hydrogen equivalent, and $SO_3$ is the conventional sulfonic acid group.

5. A process for breaking petroleum emulsions of the water-in-oil type, which consists in subjecting the emulsion to the action of a demulsifying agent consisting of a mixture derived from sulfonation of the unseparated constituents of anthracene oil, and characterized by the general formula $R'X.ZSO_3$ in which $R'$ is an anthracene oil aromatic nucleus residue, $X$ is a substituent residue derived from oleic acid, $Z$ is a metallic atom, and $SO_3$ is the conventional sulfonic acid group.

6. A process for breaking petroleum emulsions of the water-in-oil type, which consists in subjecting the emulsion to the action of a demulsifying agent consisting of a mixture, derived from sulfonation of the unseparated constituents of anthracene oil, and poduced by a mixture of a relatively large amount of anthracene oil mixed with a relatively small amount of oleic acid, and reacted with sulfuric acid until water-soluble, followed by a conventional washing process and separation of waste acid and neutralization to the methyl orange indicator end point with strong ammonia.

MELVIN DE GROOTE.
BERNHARD KEISER.
ARTHUR F. WIRTEL.